No. 641,356. Patented Jan. 16, 1900.
A. W. AGER.
MOUSE TRAP.
(Application filed Nov. 13, 1899.)
(No Model.)

Witnesses:
Archibald Young
E. M. Young.

Inventor.
Adam W. Ager.
By
Robt. P. Nains.
atty.

UNITED STATES PATENT OFFICE.

ADAM W. AGER, OF MAPLETON, NORTH DAKOTA.

MOUSE-TRAP.

SPECIFICATION forming part of Letters Patent No. 641,356, dated January 16, 1900.

Application filed November 13, 1899. Serial No. 736,817. (No model.)

*To all whom it may concern:*

Be it known that I, ADAM W. AGER, a citizen of the United States, residing at Mapleton, North Dakota, have invented certain new and useful Improvements in Mouse-Traps; and I do hereby declare the following to be a full, clear, and exact description of the invention, such as will enable others skilled in the art to which it appertains to make and use the same.

My invention relates to an improvement in mouse-traps, and has for its object to provide a simple, inexpensive, and effective means for trapping small animals—such as mice, rats, and the like—which when set will be operated by the animal while attempting to secure the bate, as will be hereinafter more fully described, and definitely pointed out in the claims.

Figure 1:
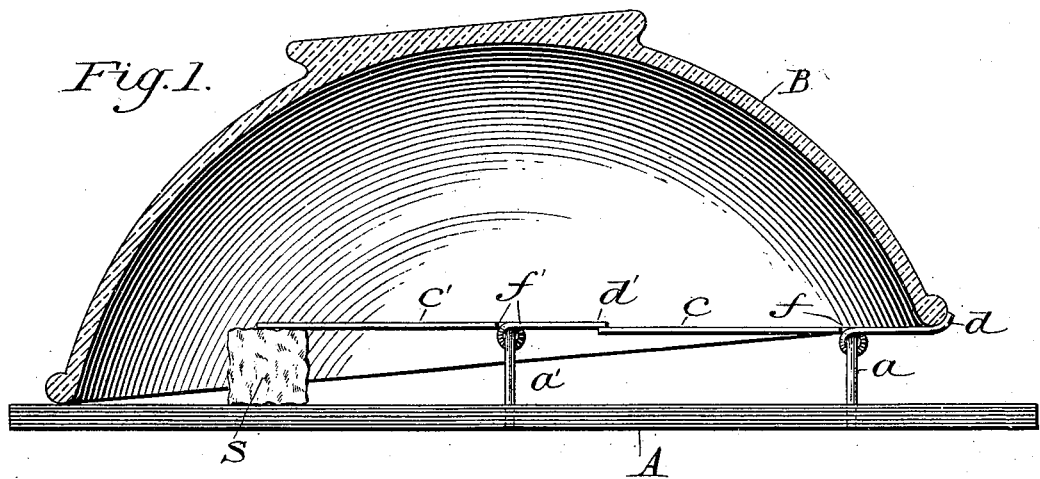
Figure 2:
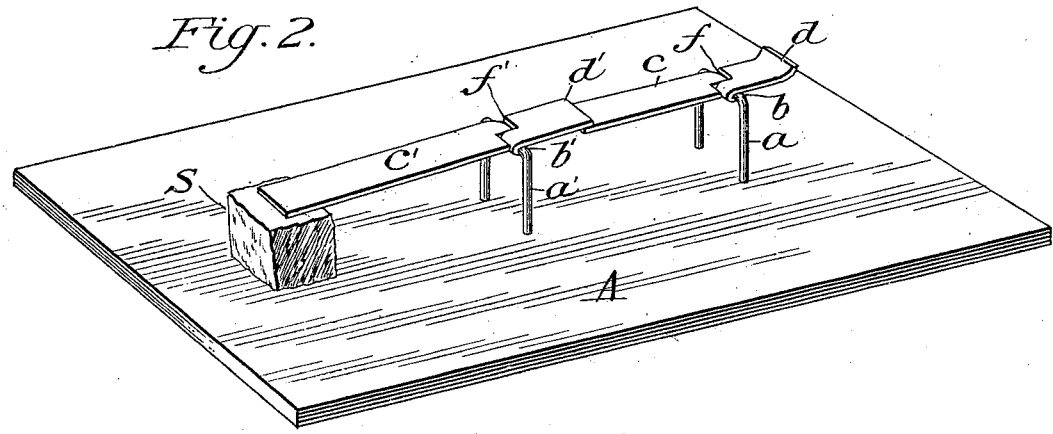

In the drawings, Figure 1 shows in vertical section my improved trap set and ready for use. Fig. 2 is a perspective view showing the relation of the parts when ready to receive and support the cage or bowl.

In the drawings, A represents the base of my improved device, which is preferably though not necessarily formed of a rectangular piece of wood, which serves as a base for the pivot-supports $a\ a'$. These pivot-supports may be formed in any suitable manner to provide pivotal supports $b\ b'$ for the levers $c\ c'$; but I prefer to make them of stout wire bent into the form of a staple, as shown, with the free ends thereof inserted or driven into holes in the base-piece A. On the horizontal arms of these pivot-supports or staples $a\ a'$ are pivoted the levers $c\ c'$, respectively, which are preferably formed of flat pieces of sheet metal. These sheet-metal pieces have a portion of the metal removed at $f\ f'$ and are turned into circular form at that point to provide a pivot or hinge connection with the horizontal supports $b\ b'$. The lever $c$ has its end $d$ turned upward to provide a rest for the edge of a cage or bowl B, Fig. 1, while its opposite end is extended to engage beneath the end $d'$ of lever $c'$, as shown. The arms of these levers $c\ c'$ are preferably formed of unequal length to better distribute the leverage, though, of course, this is not essential. It is obvious also that the levers may be made of wire, wood, or any suitable material.

In setting the trap it is only necessary to place a piece of cheese, cracker, or other bait S beneath the end of lever $c'$, as shown, and then to engage the long arm of lever $c$ beneath the end $d'$ of lever $c'$, and with the parts in this position to rest the edge of a bowl or cage B on the upturned end $d$ of lever $c$. A space is thus provided beneath the raised edge of the cage or bowl through which a small animal may pass to attack the bait S, which upon being pulled from beneath the end of lever $c'$ permits the end $d'$ to rise sufficiently to liberate the end of lever $c$, whereupon the end $d$ of lever $c$ drops and allows the cage or bowl B to fall upon the base A, thus confining the animal within.

Having thus described my invention, what I claim, and desire to secure by Letters Patent, is—

1. In a trap, the combination of a base, levers pivotally supported between their ends on said base, the end of one lever adapted to engage beneath the end of the other lever and support at its opposite end a cage or bowl, the disengaged end of the said other lever being adapted to be supported in set position by a bait.

2. In a trap, the combination of a base, pivot-supports carried thereby, two levers pivoted respectively between their ends on said supports, one of said levers adapted to be held in operative or set position by a bait beneath one end thereof the other lever positioned to engage beneath the free end of the bait-supported lever, and to support a cage or bowl on its opposite end.

3. In a trap, the combination of a base, two pivot-supports carried thereby, a lever pivoted between its ends on each of said supports, one of said levers adapted to be held in the set position by a bait beneath the end thereof, the other lever positioned to engage beneath the free end of the bait-supported lever and provided with means on its disengaged end for supporting a cage or bowl.

4. In a trap, the combination of a base, pivot-supports carried thereby, two levers bent to form a pivot or hinge connection with said supports, one of said levers adapted to be held in operative or set position by a bait
5 placed beneath the end thereof, the other lever positioned to engage beneath the free end of said bait-supported lever, and having its disengaged end turned upward to afford a support for the edge of a cage or bowl.

ADAM W. AGER.

Witnesses:
SAMUEL MITCHELL,
ANDREW J. BROWNLEE.